2 Sheets—Sheet 1.

A. BRIDGMAN & J. L. PERRY.

Assignors, by mesne assignments, to said J. L. PERRY and C. A. MATHER.

WOOD POLISHING MACHINE.

No. 10,152. Reissued July 11, 1882.

Witnesses:
E. G. Asmus
Carl Pierhardt.

Inventors:
Alnon Bridgman
By James Lyman Perry
J. Stout & Underwood
Attorneys.

2 Sheets—Sheet 2.

A. BRIDGMAN & J. L. PERRY.

Assignors, by mesne assignments, to said J. L. PERRY and C. A. MATHER.

WOOD POLISHING MACHINE.

No. 10,152. Reissued July 11, 1882.

Witnesses:
E. G. Homus
Carl Pickhardt.

Inventors:
Alnon Bridgman
James Lyman Perry
By Stout & Underwood
Attorneys.

UNITED STATES PATENT OFFICE.

ALMON BRIDGMAN AND JAMES L. PERRY, OF BERLIN, WISCONSIN, ASSIGNORS, BY MESNE ASSIGNMENTS, TO SAID JAMES L. PERRY AND CHARLES A. MATHER, OF SAME PLACE.

WOOD-POLISHING MACHINE.

SPECIFICATION forming part of Reissued Letters Patent No. 10,152, dated July 11, 1882.

Original No. 188,580, dated March 20, 1877. Application for reissue filed March 15, 1882.

*To all whom it may concern:*

Be it known that we, ALMON BRIDGMAN and JAMES LYMAN PERRY, of Berlin, in the county of Green Lake, and in the State of Wisconsin, have invented certain new and useful Improvements in Wood-Polishing Machines; and we do hereby declare that the following is a full, clear, and exact description of the construction and operation of the same, reference being had to the accompanying drawings, forming a part of this specification, in which—

Figure 1:
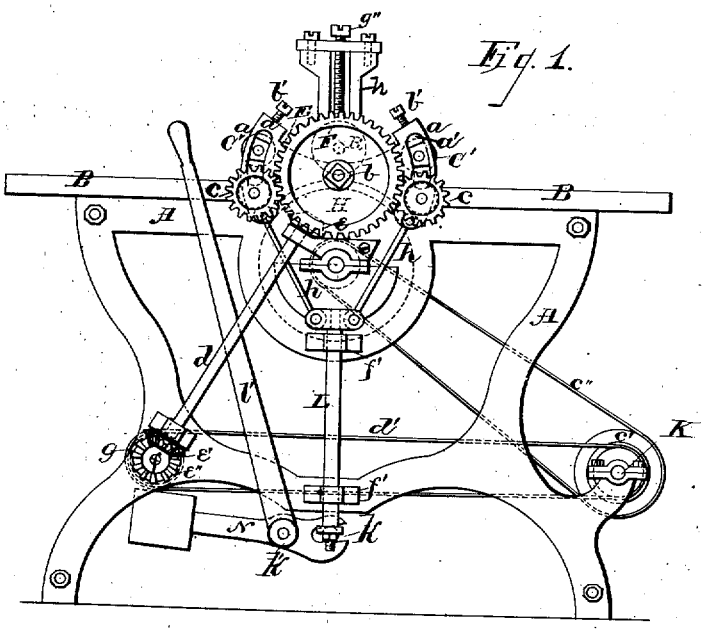
Figure 2:
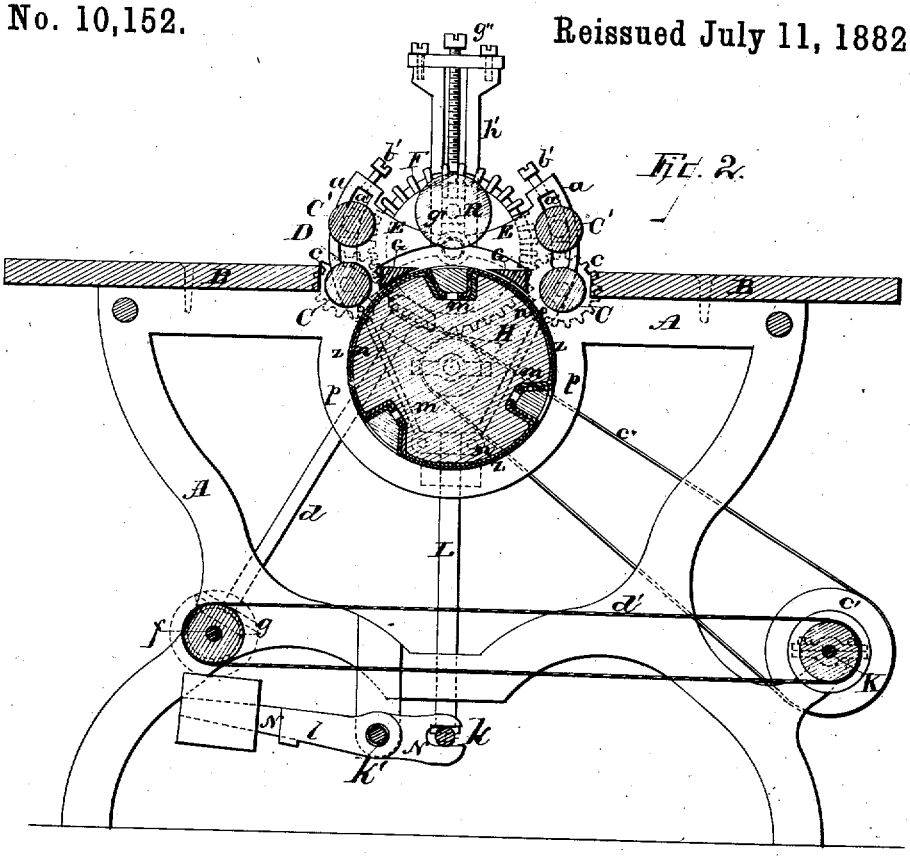
Figure 3:
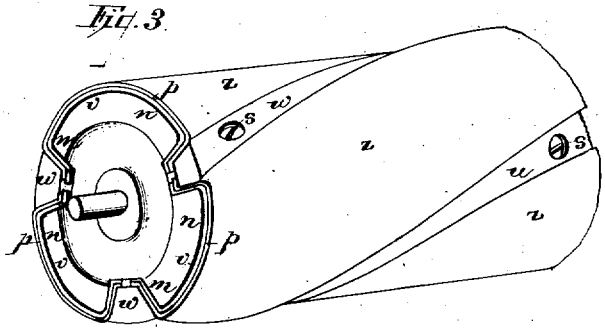

Figure 1 is a side elevation of our device. Fig. 2 is a vertical longitudinal section of the same, and Fig. 3 is a perspective view of the sand-paper cylinder.

Our invention relates to machines for finishing or polishing wood; and it consists in the construction and novel arrangement of the several parts, whereby this object may be accomplished, as more specifically described hereinafter, and pointed out in the claims, and whereby smooth and even work will be produced, whether the board to be operated upon be straight, serpentine, or circular.

In the drawings, the letter A designates the frame of the machine, which should have a convenient rectangular form and be provided with suitable bearings for the gearing and mechanism hereinafter described.

B is the feed table or platform, having a transverse opening for the feed-rolls, guards, and sand-paper cylinder.

C C represent the feed-rolls, arranged in pairs, one pair on each side of the central opening, D, of the feed-table and extending across the same parallel with the axis of the sand-paper cylinder. The journals of the feed-rolls C C turn in bearings in the lower portion of the arc-shaped ends of swinging arms E, of which latter there are four in number, a pair being pivoted to the spindle *b* of the gear-wheels F on each side of the machine. Each of the feed-rolls C is provided with a gear-wheel, *c*, on each of its ends, and these gear-wheels mesh with cogs on the periphery of wheels F, which (the cogs) extend down along the inner faces of the wheels to form bevel-gearing, by which they (the wheels F) are turned through the medium of a pair of shafts, *d*, on the ends of which are small bevel-wheels *e e'*, the former engaging with the gear-wheels F, while the latter engage with bevels *e''* on a horizontal shaft, *f*, a pulley, *g*, on which is connected with the power-shaft K by a belt, *d'*. The feed-rolls C C are not adjustable independently of the arms E; but the outer ends of the arms are adjustable to raise or lower the feed-rolls by the mechanism which I will now describe.

*h h* are branches that extend obliquely upward from vertical rods L, that reciprocate in bearings *f' f'* on each side of the frame of the machine, and the lower ends of the rods L are connected by a transverse rod-bearing, *k*, with which the bifurcated inner ends of the weight-levers N engage, the weight-levers having a constant tendency to throw the rods L up and cause them to lift the outer ends of the arms E, that are connected with rods L by the branches *h*, to carry the peripheries of the feed-rolls C out above the top of the table B, so that when the stuff is fed into the machine it will be carried away from the sand-paper cylinder, unless a sufficient pressure is brought upon it from above by mechanism such as we will describe further on to cause it to depress the feed-rolls.

Just above the bearings of the feed-rolls C we provide curved slots in the arms E, and in these arms we secure the sliding bearings of presser-rolls C', interposing rubber cushions *a'* between said bearings and the upper termination of the slots. We also pass screw-bolts down through the tops of the arms against the cushions, by which to adjust them. These rolls C' C' serve to clamp the stuff down upon feed-rolls C, while the cushions *a'* permit them to yield sufficiently to avoid binding.

Intermediate between the presser-rolls C' we journal a large presser-roll, R, in bearings *g'*, that slide up and down in slotted standards *h'*, and are adjustable vertically by means of screw-bolts *g''*. The axis of presser-roll R is parallel to and on a direct vertical line with that of the sand-paper cylinder H, and the pressure of the stuff upon the sand-paper cylinder is determined by adjusting this roll up and down to cause it to overcome the lifting force of the lever N, acting through the arms E and feed-rollers C. These opposing forces are necessary in the production of fine work, for if the stuff were fed directly upon the sand-paper cylinder a pressure from above sufficient to produce an even contact from end to end of the cylinder would be of necessity so great as to cause the sand to grind into the stuff without smoothing it, and, besides that, the weight of the stuff would always be supplemented to the pressure from the roll above, and it would be impossible to so adjust the machine as to produce various degrees of pressure from the slightest contact of the sand-paper that will merely polish to such a pressure as will reduce the thickness of the stuff materially.

A shaft, *k'*, is transversely arranged in bearings at the side of the rod *k*, and forms the fulcrum of the weight-levers. It is provided with arms *l*, which engage under the long arms of said weight-levers when its handle *l'* is raised and serve to raise the same, allowing the feed-rolls to fall, and thus the feed-rolls may be simultaneously adjusted thereby as well as independently by means of the adjusting-screws, hereinbefore described.

The sand-paper cylinder H is provided with spiral grooves *m*, in which are seated wedges *w*, which serve to clamp the edges of the sections of sand-paper and the layers under the same when secured by the screws *s*, which pass into the body of the cylinder. Over the sectional surfaces *v* of the cylinder, between the grooves, are spread layers *n p* of wadding and rubber, over which the sections *z* of sand-paper are laid. In this manner an elastic surface is built up, which aids materially in securing uniform and even work and prolongs the wear of the sand-paper, which, moreover, can be at any time easily detached and renewed should any of the sections become worn out or uneven.

In the operation of this machine the height of the pressure-roll R is adjusted according to the thickness of the stuff which is fed between the feed-rolls across the opening D of the feed-table. The feed-rolls, although holding the work upward against the pressure-roll, are depressed by it, and the operation of the sand-paper cylinder upon the under side is rendered uniform and even.

In this machine the principle of holding the work from the sanding-surface to a parallel bearing is designed to be practically carried out, and it is thought to be especially effective in the production of perfect work in smoothing with the grain.

It is evident that the relative position of the sand-paper cylinder and pressure-roll may be changed so that the former will be above the table, corresponding alterations being made in the mechanism, and that other modifications of the construction may be effected by persons skilled in the art without departing from the invention herein set forth.

Having thus described our invention, what we claim, and desire to secure by Letters Patent, is—

1. In a wood-polishing machine, the combination, with a sand-paper cylinder, of a presser-roll suspended above it in adjustable bearings, and yielding feed-rolls adapted to carry the stuff away from the cylinder and against the presser-roll, as set forth.

2. The combination of feed-rolls C, having stationary bearings in swinging arms, with presser-rolls having yielding and adjustable bearings in said arms above the bearings of the feed-rollers, as set forth.

3. In a wood-polishing machine, the combination, with the sand-paper cylinder and the parallel pressure-roll, of feeding-rolls automatically pressed toward said pressure-roll, as set forth.

4. The combination, with an adjustable pressure-roll parallel with the sand-paper cylinder, of the adjustable feed-rolls and their swinging bearings automatically pressed by suitable mechanism toward said pressure-roll, as set forth.

5. The combination, with a spirally-grooved cylinder, of sections of sand-paper and spiral clamping-wedges.

In testimony that we claim the above we have hereunto subscribed our names in the presence of two witnesses.

ALMON BRIDGMAN.
JAMES LYMAN PERRY.

Witnesses:
E. M. BUELL,
GRIFF. J. THOMAS.